United States Patent
Chuang et al.

(10) Patent No.: US 11,635,930 B2
(45) Date of Patent: Apr. 25, 2023

(54) DEVICE AND METHOD FOR IMAGE CONTROL

(71) Applicant: Aten International Co., Ltd., New Taipei (TW)

(72) Inventors: Tzu-Yi Chuang, New Taipei (TW); Ding-Yuan Wang, New Taipei (TW); Syuan-You Liao, New Taipei (TW); Chih-Chiang Chang, New Taipei (TW)

(73) Assignee: Aten International Co., Ltd., New Taipei (TW)

( * ) Notice: Subject to any disclaimer, the term of this patent is extended or adjusted under 35 U.S.C. 154(b) by 0 days.

(21) Appl. No.: 17/742,412

(22) Filed: May 12, 2022

(65) Prior Publication Data

US 2022/0391157 A1     Dec. 8, 2022

(30) Foreign Application Priority Data

Jun. 8, 2021  (TW) .................. 110120786

(51) Int. Cl.
*G06F 3/14* (2006.01)
*G09G 5/12* (2006.01)
*G09G 5/14* (2006.01)
*G06F 3/04886* (2022.01)

(52) U.S. Cl.
CPC .......... *G06F 3/1415* (2013.01); *G06F 3/1431* (2013.01); *G06F 3/1446* (2013.01); *G06F 3/04886* (2013.01); *G06F 3/1423* (2013.01); *G06F 2203/04803* (2013.01); *G09G 5/12* (2013.01); *G09G 5/14* (2013.01)

(58) Field of Classification Search
CPC .... G06F 3/1415; G06F 3/1431; G06F 3/1446; G06F 3/1423; G06F 3/04886; G06F 2203/04803; G09G 5/12; G09G 5/14
USPC .......................................... 345/1.1
See application file for complete search history.

(56) References Cited

U.S. PATENT DOCUMENTS

| | | | |
|---|---|---|---|
| 7,808,447 B1 * | 10/2010 | Cook ................ | G06F 3/1431 345/1.3 |
| 8,125,531 B2 * | 2/2012 | Van Geel ............ | H04N 23/63 348/211.3 |
| 2003/0001847 A1 * | 1/2003 | Doyle ................ | G06F 3/1431 345/501 |

(Continued)

FOREIGN PATENT DOCUMENTS

| | | |
|---|---|---|
| CN | 102343152 | 2/2012 |
| TW | 508527 | 11/2002 |
| TW | I673645 | 10/2019 |

*Primary Examiner* — Tom V Sheng
(74) *Attorney, Agent, or Firm* — JCIPRNET

(57) ABSTRACT

An image control device and an image control method are provided. The image control device includes a control command output port, an image input port, a processor and an image output unit. The control command output port transmits a scene switching command to an image source device; the image input port receives an image stream from the image source device; the processor is coupled to the image input port and the control command output port to retrieve a first image and a second image from the image stream, wherein the second image corresponds to the scene switching command; the image output unit is coupled to the processor and outputs the first image and the second image, wherein the first image is displayed in a first display area and the second image is displayed in a second display area.

16 Claims, 3 Drawing Sheets

(56) References Cited

U.S. PATENT DOCUMENTS

| | | | |
|---|---|---|---|
| 2005/0055356 A1* | 3/2005 | Tsai | G09G 5/14 |
| 2008/0111822 A1 | 5/2008 | Horowitz et al. | |
| 2008/0113793 A1* | 5/2008 | Miyamoto | A63F 13/26 |
| | | | 463/31 |
| 2013/0009998 A1* | 1/2013 | Hsieh | G06F 3/1438 |
| | | | 345/667 |
| 2013/0086528 A1* | 4/2013 | Lee | G06F 3/1454 |
| | | | 715/838 |
| 2014/0055469 A1* | 2/2014 | Liu | G06F 3/1454 |
| | | | 345/520 |
| 2015/0269912 A1* | 9/2015 | Chen | G09G 5/391 |
| | | | 345/699 |
| 2017/0064215 A1* | 3/2017 | Cho | H04N 5/268 |
| 2017/0262295 A1* | 9/2017 | Kim | G06F 3/0486 |
| 2018/0267760 A1* | 9/2018 | Shimizu | G06F 3/1415 |
| 2019/0208284 A1 | 7/2019 | Guo et al. | |
| 2020/0396324 A1* | 12/2020 | Hoellwarth | G09G 3/001 |
| 2021/0203878 A1* | 7/2021 | Lee | H04L 12/1831 |
| 2021/0208832 A1* | 7/2021 | Ishii | G06F 3/1462 |
| 2022/0027032 A1* | 1/2022 | Liu | G06F 9/451 |
| 2022/0321950 A1* | 10/2022 | Zhang | H04N 21/43072 |

* cited by examiner

DEVICE AND METHOD FOR IMAGE CONTROL

This application claims the priority benefit of Taiwan application serial no. 110120786, filed on Jun. 8, 2021. The entirety of the above-mentioned patent application is hereby incorporated by reference herein and made a part of this specification.

BACKGROUND

Technical Field

The disclosure relates to an image control device and an image control method.

Description of Related Art

Generally, when a user plays a game on a game console or a computer host, an image source of the game screens is usually a single image source device (e.g. a game console such as PS4, PS5, or Switch, or a computer host). If the game itself supports scene switching, the user usually has to switch the game screens frequently to check the states of other scenes in the game (e.g. a current state of an opponent player). However, when the user frequently switches the game screens, it is likely to cause operation errors and switch the screen to a game screen that is not expected by the user, and the user may miss the key timing during the game. Accordingly, how to enable the user to operate a device providing a single image source more smoothly is a goal for the persons skilled in the art to work on.

SUMMARY

The disclosure is directed to an image control device and an image control method outputting different images in an image stream without frequently switching the images.

The image control device of the disclosure includes a control command output port, an image input port, a processor, and an image output unit. The control command output port transmits a scene switching command to an image source device. The image input port receives an image stream from the image source device. The processor is coupled to the image input port and the control command output port to retrieve a first image and a second image from the image stream. The second image corresponds to the scene switching command. The image output unit is coupled to the processor and outputs the first image and the second image. The first image is displayed in a first display area, and the second image is displayed in a second display area.

The image control method of the disclosure includes the following. A scene switching command is transmitted to an image source device. An image stream is received from the image source device. A first image and a second image are retrieved from the image stream. The second image corresponds to the scene switching command. The first image and the second image are output by an image output unit. The first image is displayed in a first display area, and the second image is displayed in a second display area.

In light of the above, the image control device and the image control method of the disclosure can retrieve the image in the image stream based on the scene switching command. Accordingly, the different images in the image stream may be output through different image output ports. In addition, the different retrieved images may have different frame rates to further optimize the user experience.

In order to make the aforementioned features and advantages of the disclosure comprehensible, embodiments accompanied with drawings are described in detail below.

DESCRIPTION OF THE EMBODIMENTS

Figure 1:
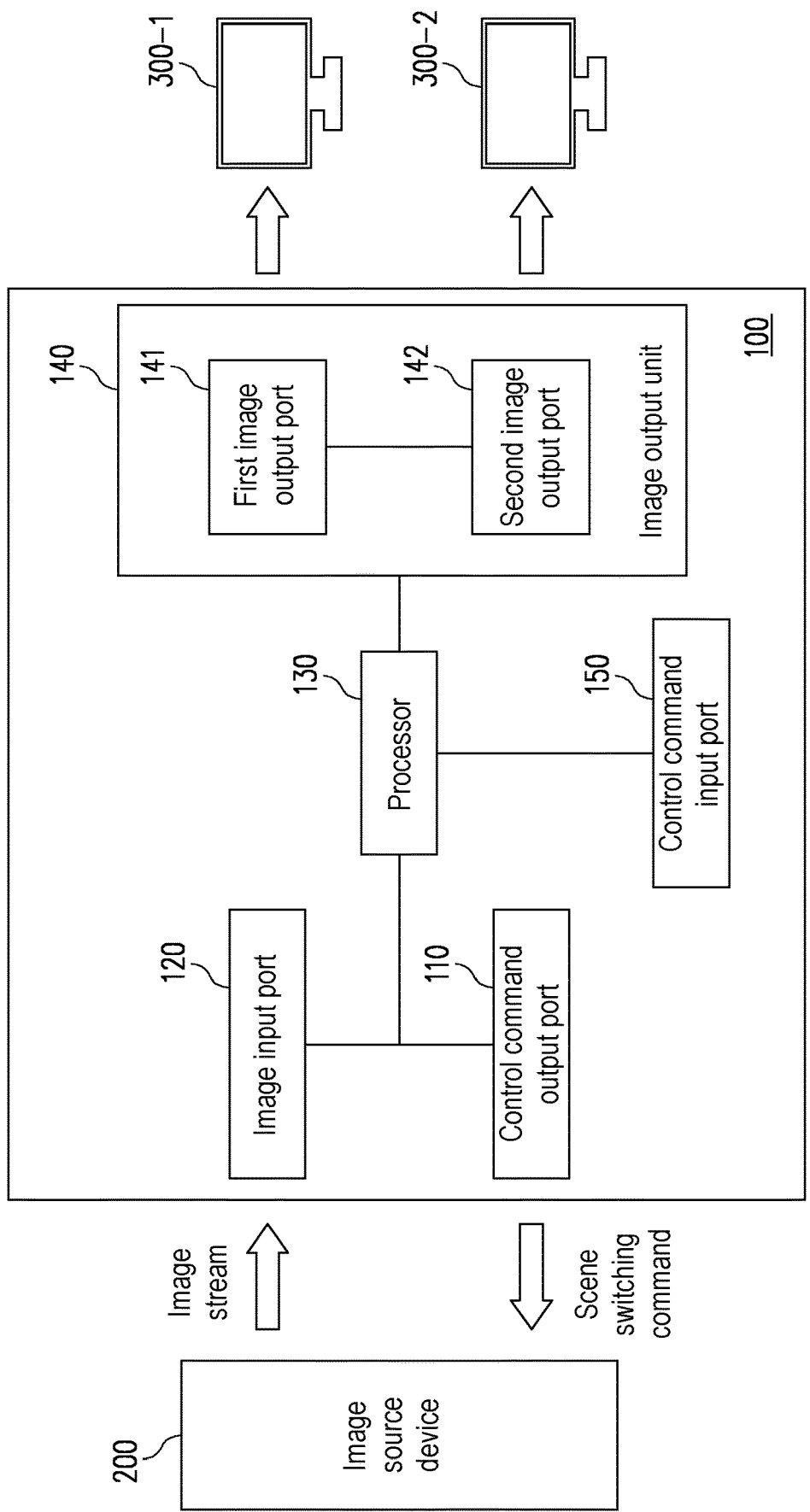
FIG. 1 is a block diagram of a structure of an image control device according to an embodiment of the disclosure.

FIG. 1 is a block diagram of a structure of an image control device 100 according to an embodiment of the disclosure. Referring to FIG. 1, the image control device 100 includes a control command output port 110, an image input port 120, a processor 130, an image output unit 140, and a control command input port 150. The processor 130 is coupled to the control command output port 110, the image input port 120, the image output unit 140, and the control command input port 150.

The image output unit 140 may include a first image output port 141 and a second image output port 142. The first image output port 141 is coupled to the processor 130, and the second image output port 142 is coupled to the processor 130.

The image input port 120, the first image output port 141 and the second image output port 142 may be a high definition multimedia interface (HDMI), a display port (DP), a digital visual interface (DVI), a video graphics array (VGA), a serial peripheral interface (SPI), or other similar transmission interfaces. However, the disclosure is not limited thereto.

The control command output port 110 and the control command input port 150 may be a universal serial bus (USB) interface, a joystick connection interface of a designated game console, or other similar transmission interfaces. However, the disclosure is not limited thereto.

The processor 130 may be a central processing unit (CPU), or other programmable general-purpose or special-purpose microprocessor, a digital signal processor (DSP), a programmable controller, an application specific integrated circuit (ASIC), or other similar elements or a combination of the above elements. However, the disclosure is not limited thereto.

An image source device 200 may provide an image content including an output image. The image source device 200 may be a computer host, a DVD player, or a game console, and the like. The disclosure is not limited thereto.

A display device 300-1 and a display device 300-2 are, for example, a liquid crystal display (LCD), a light-emitting diode (LED) display, a plasma display, an organic light emitting diode display, or other types of display devices. Note that the number of the display devices in FIG. 1 is only illustrative. The disclosure does not intend to limit the number of the display devices.

Figure 2:
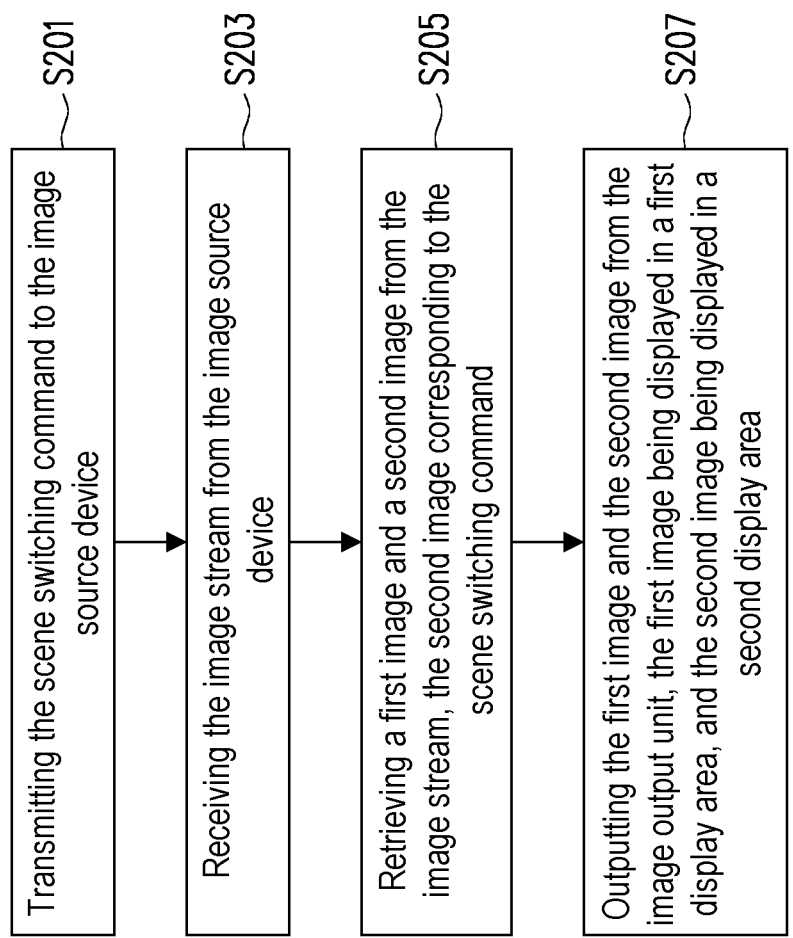
FIG. 2 is a flow chart of an image control method according to an embodiment of the disclosure.

FIG. 2 is a flow chart of an image control method according to an embodiment of the disclosure. The image control method may be performed by the image control device 100 in FIG. 1.

Referring to FIG. 1 and FIG. 2, in step S201, the control command output port 110 may transmit a scene switching command to the image source device 200. For example, if an image stream is a computer game, the scene switching command may instruct to switch real-time images of different positions in the computer game (e.g. a real-time strategy game) or instruct to switch images of different angles of view (e.g. switch a front-view image of a race car to a rear-view image of the race car) in the computer game (e.g. a car race game).

The scene switching command may be stored in a storage unit (not shown) outside the image control device 100 and be prompted by the processor 130 to output to the control command output port 110 for an output. In another embodiment, the image control device 100 may include a storage unit (not shown), and the scene switching command is stored in the storage unit of the image control device 100. Then the processor 130 may prompt on its own to output the scene switching command to the control command output port 110 for an output. The storage unit may be a random access memory (RAM), a read-only memory (ROM), an electrically-erasable programmable read-only memory (EEPROM), a hard disk drive (HDD), or a USB flash drive. However, the disclosure is not limited thereto.

In an embodiment, the image control device 100 may include an input and output device (not shown). The scene switching command may be set by a user via the input and output device of the image control device 100, and the user may adjust the content, time period, or other settings of the scene switching command. The disclosure is not limited thereto.

In step S203, the image input port 120 receives the image stream from the image source device 200. For example, the image stream may be successive images (successive frames) of the computer game.

In step S205, the processor 130 retrieves a first image and a second image from the image stream, and the second image corresponds to the scene switching command. For example, if the scene switching command instructs to switch the front-view image of the race car to the rear-view image of the race car in the computer car race game, the first image may be the front-view image, and the second image may be the rear-view image (i.e. the second image corresponds to a switched scene instructed by the scene switching command).

In step S207, the image output unit 140 outputs the first image and the second image. The first image is displayed in a first display area, and the second image is displayed in a second display area.

In the embodiment shown in FIG. 1, the first image output port 141 outputs the first image to the first display device 300-1, and the first display device 300-1 displays the first display area. In addition, the second image output port 142 outputs the second image to the second display device 300-2, and the second display device 300-2 displays the second display area. In other words, the first image and the second image may be displayed simultaneously on different display devices.

Figure 3:
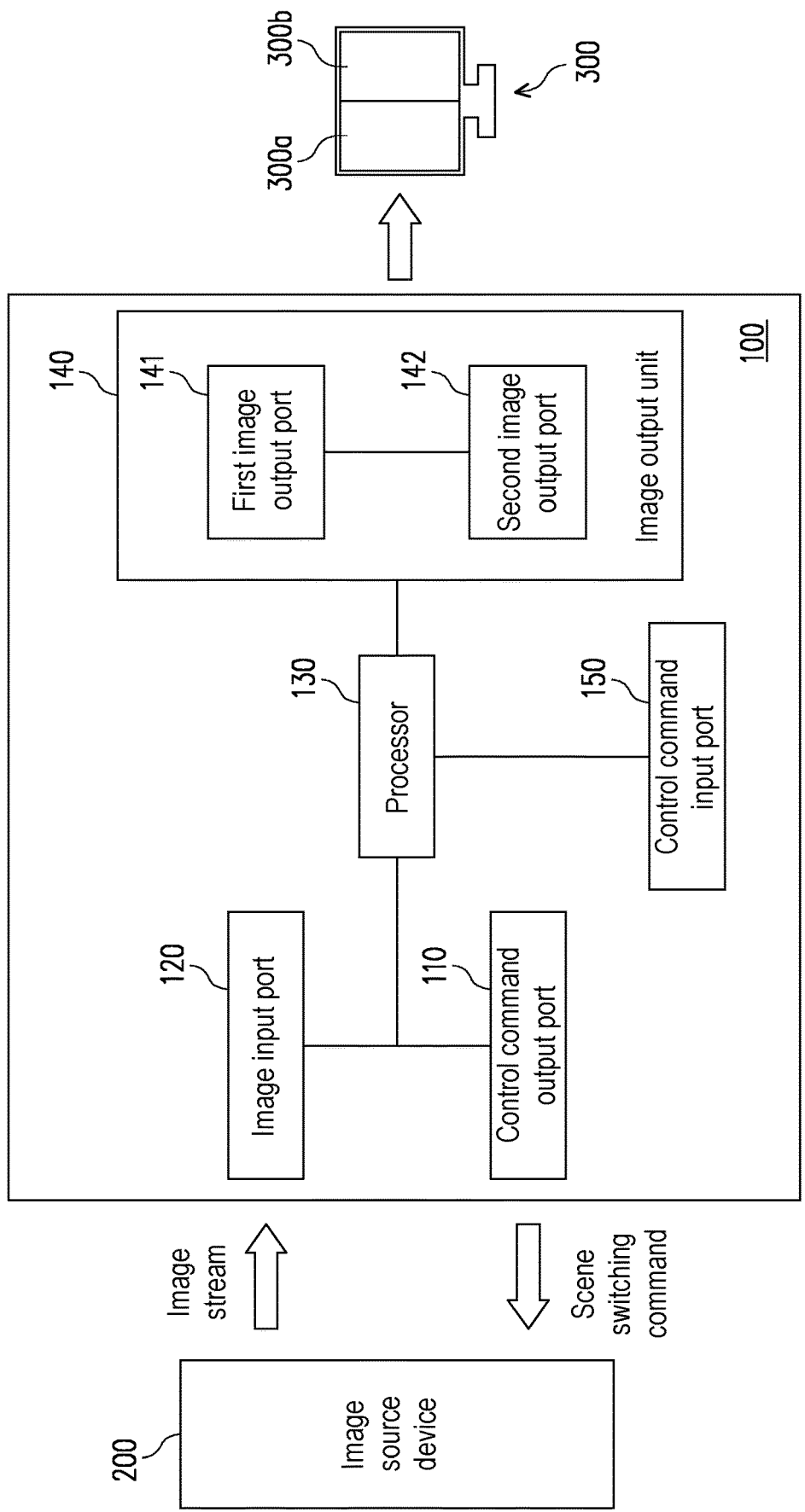
FIG. 3 is a block diagram of a structure of an image control device according to another embodiment of the disclosure.

FIG. 3 is a block diagram of a structure of the image control device 100 according to another embodiment of the disclosure. The difference between FIG. 3 and FIG. 1 is that the image output unit 140 in FIG. 3 is coupled to a single display device (a display device 300).

In other words, in the embodiment shown in FIG. 3, the first display area and the second display area may be displayed simultaneously on different split screens of the display device 300 (e.g. the first display area is displayed on a split screen 300a, and at the same time, the second display area is displayed on a split screen 300b). Based on the above, the first image and the second image may be displayed simultaneously on the different split screens of the display device 300.

In an embodiment, after the scene switching command is output, the image output unit 140 may stop outputting the second image if the processor 130 determines that there is no scene switching on a current frame relative to a previous frame of the current frame. Specifically, after the processor 130 retrieves the second image (corresponding to the scene switching command) from the image stream (i.e. step S205), in step S207, the processor 130 may compare the current frame and the previous frame of the retrieved second image. For example, if the processor 130 determines that the difference between the current frame and the previous frame is greater than a threshold value, the processor 130 may determine that there is scene switching on the current frame relative to the previous frame of the current frame. The threshold value may be the difference between the image characteristics of the current frame and the previous frame. The image characteristics may be the difference between the pixels, object contours, color distribution, brightness distribution, and the gamma curves. The disclosure is not limited thereto. In other words, the threshold value may be a corresponding value of various image characteristics such that the difference between the image characteristics of the current frame and the previous frame may be determined.

If the processor 130 determines that there is scene switching on the current frame relative to the previous frame of the current frame, the image output unit 140 may output the second image. On the other hand, if the processor 130 determines that there is no scene switching on the current frame relative to the previous frame of the current frame, the image output unit 140 may stop outputting the second image.

In an embodiment, the number of frames per second of the first image plus the number of frames per second of the second image is less than or equal to the number of frames per second (frame rate) of the image stream. For example, if the image stream runs at 100 frames per second, the first image may run at 60 frames per second and the second image may run at 20 frames per second.

In an embodiment, the number of frames per second of the first image divided by the number of frames per second of the second image is equal to a predetermined ratio of number of frames. Specifically, the predetermined ratio of number of frames is adopted so that the output first image and the output second image have different numbers of frames per second, and the numbers of frames per second of the first image and the second image are determined based on the ratio. Based on the above, the first image and the second image may be displayed at the numbers of frames per second of the first image and the second image based on the predetermined ratio of number of frames. In an embodiment, one of the first image and the second image may be displayed at a greater numbers of frames (e.g. it may be easier for the user to watch the first image displayed at a greater number of frames). For example, the first image may run at 60 frames per second, and the second image may run at 40 frames per second.

In an embodiment, after the scene switching command is transmitted to the image source device 200, the control command output port 110 may transmit a scene restoring command to the image source device 200. For example, if the scene switching command instructs to switch the front-view image of a race car to the rear-view image of the race car in the computer game (e.g. a car race game), the scene restoring command may instruct to restore to an image of the previous angle of view in the computer game (e.g. restore the rear-view image of the race car to the front-view image of the race car). The scene restoring command may be stored in the storage unit (not shown) of the image control device 100 in advance or be dynamically set by the user.

The processor 130 may retrieve a third image from the image stream. The third image corresponds to the scene restoring command. For example, if the scene restoring command instructs to restore the rear-view image of the race car to the front-view image of the race car in the computer car race game, the third image may be the front-view image (i.e. the third image corresponds to a restored scene instructed by the scene restoring command). The image output unit 140 may output the third image. The third image may be displayed in the first display area (i.e. the third image and the first image may be displayed in the same display area). For example, as described in the embodiments above, in the embodiment shown in FIG. 1, the third image may be displayed in the first display area displayed by the display device 300-1. Alternatively, in the embodiment shown in FIG. 3, the third image may be displayed on the split screen 300a of the display device 300. In an embodiment, the angle of view of the third image may be the same as the angle of view of the first image, which means that the third image may be retrieved to refresh and replace the original first image displayed by the display device 300-1 (or on the split screen 300a).

In an embodiment, the processor 130 may periodically prompt the control command output port 110 to output the scene switching command. In other words, the processor 130 may prompt the control command output port 110 to output the scene switching command to the image source device 200 at regular intervals (e.g. every 1 ms, 0.5 ms, or any other interval).

In another embodiment, the processor 130 may periodically prompt the control command output port 110 to output the scene restoring command.

In other words, if described with the embodiment shown in FIG. 1, when the control command output port 110 does not output the scene switching command, the processor 130 continues retrieving the first image from the image input port 120 and outputting the first image to the display device 300-1 via the image output unit 140. When the control command output port 110 starts periodically outputting the scene switching command and the scene restoring command, the processor 130 retrieves the first image, the second image, and the third image based on the scene switching command and the scene restoring command to periodically retrieve and refresh the images displayed by the display device 300-1 and the display device 300-2. That is, as described in the embodiments above, the third image and the first image may be displayed in the same first display area, and the processor 130 may further determine whether to output the second image (to display in the second display area) based on the current frame and the previous frame of the second image. Accordingly, periodically replacing the first image with the third image and periodically outputting the second image allow the user to continue playing the game with the first image displayed by the display device 300-1 and obtain a state of another scene by observing the screen of the display device 300-2.

In an embodiment, the control command input port 150 may be configured to receive a user command. For example, after the user operates an input device (e.g. a keyboard, a mouse, a game joystick, or any combinations thereof), the user command is transmitted to the control command input port 150 via the input device.

The processor 130 may determine whether the control command input port 150 receives the user command. When the processor 130 determines that the control command input port 150 receives the user command, the processor 130 may transmit the user command to the control command output port 110. The control command output port 110 may output the user command.

Furthermore, as described in the embodiments above, when the processor 130 periodically prompts the control command output port 110 to output the scene switching command, the processor 130 may process the user command with higher priority if the processor 130 determines that the control command input port 150 receives the user command. As a result, the processor 130 may transmit the user command to the control command output port 110 first and suspend periodically prompting the control command output port 110 to output the scene switching command for a period of time (i.e. a transmission suspension time). After the transmission suspension time elapses, the processor 130 may continue to periodically prompt the control command output port 110 to output the scene switching command.

In light of the above, the image control device and the image control method of the disclosure can retrieve the image in the image stream based on the scene switching command. Accordingly, the different images in the image stream may be output through different image output ports. In addition, the different retrieved images may have different frame rates to further optimize the user experience. Furthermore, the image control device and the image control method of the disclosure can stop transmitting the scene switching command when receiving the user command. Hence, the original operation method which the user is adapted to is not affected.

Although the disclosure has been described with reference to the above embodiments, they are not intended to limit the disclosure. It will be apparent to one of ordinary skill in the art that modifications to the described embodiments may be made without departing from the spirit and the scope of the disclosure. Accordingly, the scope of the disclosure will be defined by the attached claims and their equivalents and not by the above detailed descriptions.

What is claimed is:

1. An image control device, comprising:
   a control command output port transmitting a scene switching command to an image source device;
   an image input port receiving an image stream from the image source device;
   a processor coupled to the image input port and the control command output port to retrieve a first image and a second image from the image stream, wherein the second image corresponds to the scene switching command; and
   an image output unit coupled to the processor to output the first image and the second image, wherein the first image is displayed in a first display area and the second image is displayed in a second display area.

2. The image control device according to claim 1, wherein after the control command output port transmits the scene switching command to the image source device, the control command output port transmits a scene restoring command to the image source device,
   the processor retrieves a third image from the image stream, wherein the third image corresponds to the scene restoring command, the image output unit outputs the third image, and the third image is displayed in the first display area.

3. The image control device according to claim 1, wherein the processor periodically prompts the control command output port to output the scene switching command.

4. The image control device according to claim 1, further comprising:
a control command input port coupled to the processor, wherein
the control command output port outputs a user command in response to the processor determining that the control command input port receives the user command.

5. The image control device according to claim 1, wherein after the scene switching command is output, the image output unit stops outputting the second image in response to the processor determining that there is no scene switching on a current frame relative to a previous frame of the current frame.

6. The image control device according to claim 1, wherein the number of frames per second of the first image plus the number of frames per second of the second image is less than or equal to the number of frames per second of the image stream.

7. The image control device according to claim 1, wherein the image output unit comprises:
a first image output port coupled to the processor to output the first image to a first display device displaying the first display area; and
a second image output port coupled to the processor to output the second image to a second display device displaying the second display area.

8. The image control device according to claim 1, wherein the image output unit is coupled to a display device, and the first display area and the second display area are displayed simultaneously on a plurality of different split screens of the display device.

9. An image control method performed by an image control device, the image control method comprising:
transmitting a scene switching command to an image source device;
receiving an image stream from the image source device;
retrieving a first image and a second image from the image stream, wherein the second image corresponds to the scene switching command; and
outputting the first image and the second image by an image output unit,
wherein the first image is displayed in a first display area and the second image is displayed in a second display area.

10. The image control method according to claim 9, further comprising:
transmitting a scene restoring command to the image source device after transmitting the scene switching command to the image source device;
retrieving a third image from the image stream, wherein the third image corresponds to the scene restoring command; and
outputting the third image by the image output unit, wherein the third image is displayed in the first display area.

11. The image control method according to claim 9, wherein transmitting the scene switching command to the image source device comprises:
periodically prompting a control command output port of the image control device to output the scene switching command.

12. The image control method according to claim 9, further comprising:
outputting a user command by a control command output port in response to determining that a control command input port of the image control device receives the user command.

13. The image control method according to claim 9, wherein outputting the first image and the second image by the image output unit comprises:
after the scene switching command being output, stopping outputting the second image by the image output unit in response to determining that there is no scene switching on a current frame relative to a previous frame of the current frame.

14. The image control method according to claim 9, wherein the number of frames per second of the first image plus the number of frames per second of the second image is less than or equal to the number of frames per second of the image stream.

15. The image control method according to claim 9, wherein the image output unit comprises a first image output port and a second image output port, and outputting the first image and the second image by the image output unit comprises:
outputting the first image to a first display device by the first image output port, wherein the first image is displayed in the first display area of the first display device; and
outputting the second image to a second display device by the second image output port, wherein the second image is displayed in the second display area of the second display device.

16. The image control method according to claim 9, wherein outputting the first image and the second image by the image output unit comprises:
outputting the first image and the second image to a display device by the image output unit, the first display area and the second display area being displayed simultaneously on a plurality of different split screens of the display device.

* * * * *